and Written Opinion, dated Feb. 10, 2021, 10 pages.

United States Patent
Crawford et al.

(10) Patent No.: US 11,237,294 B2
(45) Date of Patent: Feb. 1, 2022

(54) TRAJECTORY CONTROL FOR DIRECTIONAL DRILLING USING AZIMUTHAL GAMMA RAY MEASUREMENTS

(71) Applicant: Halliburton Energy Services, Inc., Houston, TX (US)

(72) Inventors: Jeffrey James Crawford, Katy, TX (US); Jiaxin Wang, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/087,384

(22) Filed: Nov. 2, 2020

(65) Prior Publication Data

US 2021/0231829 A1    Jul. 29, 2021

Related U.S. Application Data

(60) Provisional application No. 62/967,394, filed on Jan. 29, 2020.

(51) Int. Cl.
*G01V 5/12*    (2006.01)
*G01V 5/04*    (2006.01)

(52) U.S. Cl.
CPC ............... *G01V 5/12* (2013.01); *G01V 5/045* (2013.01)

(58) Field of Classification Search
CPC ............. G01V 5/12; G01V 5/04; G01V 5/045
See application file for complete search history.

(56) References Cited

U.S. PATENT DOCUMENTS

| 7,751,280 | B2 | 7/2010 | Denichou et al. |
| 10,830,033 | B2 * | 11/2020 | Weideman ............... E21B 44/04 |
| 2010/0004867 | A1 | 1/2010 | Zhou et al. |
| 2014/0116776 | A1 | 5/2014 | Marx et al. |
| 2019/0048707 | A1 | 2/2019 | Benson et al. |

FOREIGN PATENT DOCUMENTS

WO    2012173601    12/2012

OTHER PUBLICATIONS

Application No. PCT/US2020/058593, International Search Report and Written Opinion, dated Feb. 10, 2021, 10 pages.
Halliburton, "iCruise Intelligent Rotary Steerable System", 2020, 26 pages.

* cited by examiner

*Primary Examiner* — David P Porta
*Assistant Examiner* — Fani Boosalis
(74) *Attorney, Agent, or Firm* — Kilpatrick Townsend & Stockton LLP

(57) ABSTRACT

A method includes receiving a drilling parameter, a tool characterization parameter, and a formation model. The method includes generating a forward model of a tool response at a bed boundary using the one drilling parameter, the tool characterization parameter, and the formation model. The method includes predicting at least two azimuthal gamma logs using the forward model. The method includes determining that a difference between the at least two azimuthal gamma logs generates a confidence level that is greater than a confidence threshold. In response to determining that the difference between the at least two azimuthal gamma logs generates the confidence level that is greater than the confidence threshold, the method includes generating a well plan. The method includes outputting a command for controlling a trajectory in directionally drilling a wellbore within a formation associated with the formation model using the well plan.

19 Claims, 13 Drawing Sheets

TRAJECTORY CONTROL FOR DIRECTIONAL DRILLING USING AZIMUTHAL GAMMA RAY MEASUREMENTS

CROSS-REFERENCE TO RELATED APPLICATION

This claims the benefit to U.S. Provisional Application No. 62/967,394 filed on Jan. 29, 2020, titled "Trajectory Control for Directional Drilling using Azimuthal Gamma Ray Measurements," the disclosure of which is hereby incorporated by reference in its entirety for all purposes.

TECHNICAL FIELD

The present disclosure relates generally to drilling wellbores in a subterranean environment. More specifically, but not by way of limitation, this disclosure relates to controlling a wellbore drilling trajectory based on an azimuthal gamma-ray measurements from within a wellbore.

BACKGROUND

A well system, such as an oil and gas well system, may include a wellbore drilled through subterranean formation. The subterranean formation may include a rock matrix permeated by oil or gas that is to be extracted using the well system. During the drilling operation, a drill bit may approach or pass through various rock formation boundaries in the rock matrix.

Visualizing the formation gamma-ray activity while drilling into the earth provides information to surface controllers and personnel. Providing downhole information to a surface computing system may improve efficiency and reliability of wellbore drilling. Visualization of the formation gamma-ray activity is difficult because of tool-specific physics (or any physics) and the uncertainty of the measurement data about the formation structures.

DETAILED DESCRIPTION

Figure 1:
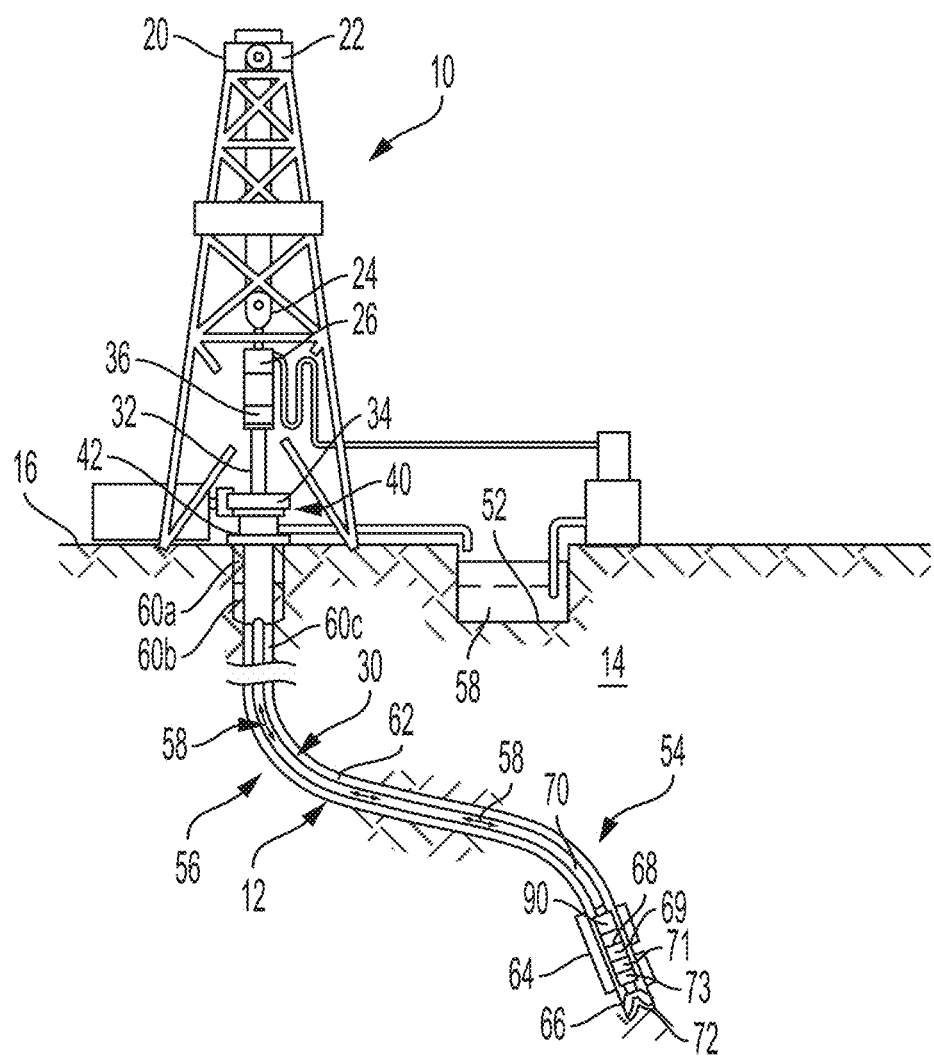
FIG. 1 is a cross-sectional view of a well system incorporating a trajectory control system according to some examples of the present disclosure.

Certain aspects and features relate to a trajectory control system usable for controlling a rotary steerable system during a wellbore drilling operation. For example, the trajectory control system can receive information from sensors capable of determining formation characteristics surrounding the rotary steerable system that is positioned within a wellbore. Based on the formation characteristics, the trajectory control system can maintain the rotary steerable system within a target formation by adjusting inclination and azimuth set-points of a drill bit. That is, the trajectory control system can determine a formation characteristics of the formation surrounding a drill bit, and adjust a trajectory of the drill bit to maintain the drill bit within a target formation based on the formation characteristics.

Formation models may include an indication of particular formation characteristics that are relevant to production of hydrocarbons in oil and gas wells. As the wellbore is drilled, measurement-while-drilling (MWD) and logging-while-drilling (LWD) measurements may be used to update the formation models to more accurately represent the formations encountered during the drilling operation. Further, while the formation models may initially be used to control the trajectory of the drill bit through the rotary steerable system, the MWD and LWD measurements may be relied upon to maintain the drill bit within the target formation. For example, the MWD and LWD measurements may be used by the trajectory control system to automatically regulate inclination and azimuth set points used by a cruise controller, such as an attitude-hold controller, of the rotary steerable system.

Some examples can provide systems and methods usable to control a trajectory of a rotary steerable system during a drilling operation of a wellbore to increase pay zone contact while reducing an amount of surface-to-downhole communication. A target trajectory reference may be received from a formation model that estimates the geology surrounding a target bed. As the drill bit drills into the formation, sensors may provide real-time formation evaluation measurements to the trajectory control system from a formation evaluation while drilling (FEWD) tools, LWD tools, MWD tools, or a combination thereof. Based on the real-time formation evaluation measurements, the trajectory control system may determine corrective attitude (i.e., inclination angle and azimuth angle) set-point changes for the drill bit. A target trajectory reference may be adjusted with the corrective attitude set-point change to determine the new trajectory set point. The new trajectory set point may be provided to the rotary steerable system to maintain the drill bit in the target formation. The formation model may also be updated based on the real-time formation evaluation measurements, and the target trajectory reference may be updated based on the updated formation model. This process, such as trajectory updates and formation model updates, may be repeated until the drilling operation in the wellbore is completed.

In an example, azimuthal gamma-ray (GR) LWD tools may provide information that is useable for geosteering applications in directional drilling. For example, the GR LWD tools can indicate a relative stratigraphic position of the drill bit to determine whether the drill bit should be steered in a different direction to maintain the drill bit within the target formation. In some examples, a forward-modeling and inversion technique may provide an optimized pre-job planning and quantitative real-time decision-making for accurate geosteering using the azimuthal GR readings by the GR LWD tools. The pre-job planning may indicate a specific set of one or more tools to include in a bottom hole assembly, produce a predicted azimuthal gamma log curve ("gamma log"), determine stratigraphic markers, determine trajectory and ROP, etc. Optimizing the pre-job planning may provide an accurately predicted gamma log for a selected gamma tool, as well as a quantitative confidence that this tool will be able to detect the presence of a bed boundary.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of a well system 10 incorporating a trajectory control system 90 according to some examples of the present disclosure. The well system 10 can include a wellbore 12 extending through various earth strata in a formation 14 (e.g., a subterranean formation) located below the well surface 16. The wellbore 12 may be formed of a single bore or multiple bores extending into the formation 14, and disposed in any orientation. The well system 10 can include a derrick or drilling rig 20. The drilling rig 20 may include a hoisting apparatus 22, a travel block 24, and a swivel 26 for raising and lowering casing, drill pipe, coiled tubing, and other types of pipe or tubing strings or other types of conveyance vehicles, such as wireline, slickline, and the like. The wellbore 12 can include a drill string 30 that is a substantially tubular, axially-extending drill string formed of drill pipe joints coupled together end-to-end.

The drilling rig 20 may include a kelly 32, a rotary table 34, and other equipment associated with rotation or translation of drill string 30 within the wellbore 12. For some applications, the drilling rig 20 may also include a top drive unit 36. The drilling rig 20 may be located proximate to a wellhead 40, as shown in FIG. 1, or spaced apart from the wellhead 40, such as in the case of an offshore arrangement. One or more pressure control devices 42, such as blowout preventers (BOPS) and other well equipment may also be provided at wellhead 40 or elsewhere in the well system 10.

A drilling or service fluid source 52 may supply a drilling fluid 58 pumped to the upper end of the drill string 30 and flowed through the drill string 30. The fluid source 52 may supply any fluid utilized in wellbore operations, including drilling fluid, drill-in fluid, acidizing fluid, liquid water, steam, or some other type of fluid.

The well system 10 may have a pipe system 56. For purposes of this disclosure, the pipe system 56 may include casing, risers, tubing, drill strings, subs, heads or any other pipes, tubes or equipment that attaches to the foregoing, such as the drill string 30, as well as the wellbore and laterals in which the pipes, casing, and strings may be deployed. In this regard, the pipe system 56 may include one or more casing strings 60 cemented in the wellbore 12, such as the surface 60a, intermediate 60b, and other casing strings 60c shown in FIG. 1. An annulus 62 is formed between the walls of sets of adjacent tubular components, such as concentric and non-concentric casing strings 60 or the exterior of drill string 30 and the inside wall of the wellbore 12 or the casing string 60c.

Where the subsurface equipment 54 is used for drilling and the conveyance vehicle is a drill string 30, the lower end of the drill string 30 may include a bottom hole assembly 64, which may carry at a distal end a drill bit 66. During drilling operations, a weight-on-bit is applied as the drill bit 66 is rotated, thereby enabling the drill bit 66 to engage the formation 14 and drill the wellbore 12 along a predetermined path toward a target zone. In general, the drill bit 66 may be rotated with the drill string 30 from the drilling rig 20 with the top drive unit 36 or the rotary table 34, or with a downhole mud motor 68 within the bottom hole assembly 64.

The bottom hole assembly 64 or the drill string 30 may include various other tools, including a power source 69, a rotary steerable system 71, and measurement equipment 73, such as measurement while drilling (MWD) or logging while drilling (LWD) instruments, sensors, circuits, or other equipment to provide information about the wellbore 12 or the formation 14, such as positioning, logging, or measurement data from the wellbore 12. While FIG. 1 describes the system using a rotary steerable system, any directional steering can be used including a directional motor system.

Measurement data and other information from the tools may be communicated using electrical signals, acoustic signals, or other telemetry that can be received at the well surface 16 to, among other things, monitor the performance of the drill string 30, the bottom hole assembly 64, and the associated drill bit 66, as well as monitor the conditions of the environment to which the bottom hole assembly 64 is subjected (e.g., drilling fluid 58 flow rate, formation characteristics, etc.).

The drilling fluid 58 may be pumped to the upper end of drill string 30 and flow through a longitudinal interior 70 of the drill string 30, through the bottom hole assembly 64, and exit from nozzles formed in the drill bit 66. At the bottom end 72 of the wellbore 12, the drilling fluid 58 may mix with formation cuttings, formation fluids (e.g., fluids containing gasses and hydrocarbons), and other downhole fluids and debris. The drilling fluid mixture may then flow upwardly through an annulus 62 to return formation cuttings and other downhole debris to the well surface 16.

After drilling through a portion of the formation 14 or while drilling through the formation 14, the measurement equipment 73 can provide survey feedback to the trajectory control system 90. In some examples, the trajectory control system 90 can analyze the survey feedback from the measurement equipment 73 to determine a position including a true vertical depth and a lateral distance and an attitude including an inclination and an azimuth of the drill bit 66 within the wellbore 12. The survey feedback information from the measurement equipment 73 can also provide information about formation characteristics of the formation 14 to the trajectory control system 90.

The trajectory control system 90 can adjust the trajectory of the drill bit 66 by providing inclination and azimuth set-point changes to the rotary steerable system 71. The inclination and azimuth set-point changes may provide an indication of a new desired trajectory of the drill bit 66 to the rotary steerable system 71 to maintain the drill bit 66 in a target formation, as indicated by the measurement equipment 73. As the drill bit 66 continues to drill the wellbore 12, the trajectory control system 90 may continue to adjust the inclination and azimuth set-point changes based on the survey feedback information from the measurement equipment 73. Further, a formation model, which provides an indication of a target trajectory reference to the trajectory control system 90, may be continuously updated based on the survey feedback information from the measurement equipment 73.

While the trajectory control system 90 is depicted as part of the bottom hole assembly 64, in some examples the trajectory control system 90 may be implemented at the well surface 16. For example, the trajectory control system 90 may be operated at the well surface 16 along with other drilling control equipment. In some examples, the trajectory control system 90 may perform some operations within the wellbore 12 (e.g., adjusting the target trajectory of the drill bit 66) and other operations at an additional component of the trajectory control system 90 located at the well surface 16 (e.g., updating a formation model and reference trajectory). Additionally, while FIG. 1 depicts the trajectory control system 90 operating in a land-based drilling environment, the trajectory control system 90 may also be implemented in an offshore drilling environment.

Figure 2:
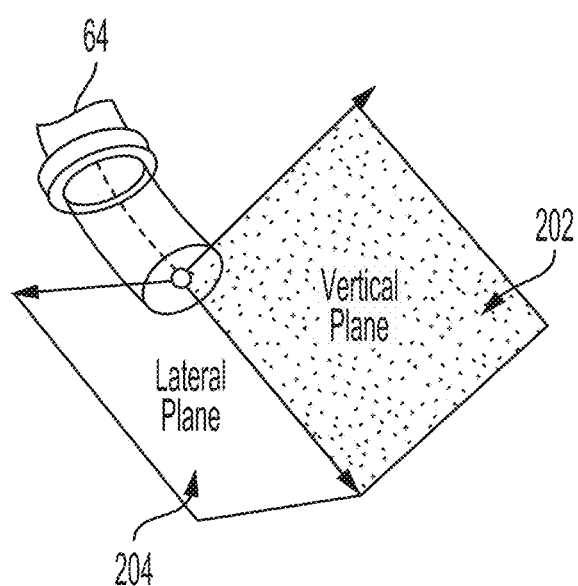
FIG. 2 depicts a vertical plane and lateral plane of a bottom hole assembly according to one aspect of the present disclosure.

FIG. 2 depicts a vertical plane 202 and lateral plane 204 of a bottom hole assembly according to one aspect of the present disclosure. The inclination set-point change may enable the rotary steerable system 71 of the bottom hole assembly 64 to control the drill bit 66 in the vertical plane 202. Additionally, the azimuth set-point change may enable the rotary steerable system 71 to control the drill bit 66 in the lateral plane 204. By combining the set-point changes to both the azimuth and the inclination, the rotary steerable system 71 is able to control direction of the drilling by the drill bit 66 toward the trajectory indicated by the well plan.

In an example, each time a new survey feedback is received by the trajectory control system 90 (e.g., indicating new information about formation characteristics surrounding the bottom hole assembly 64), a new set of inclination and azimuth set-point changes may be generated and provided to the rotary steerable system 71. The new survey feedback may be generated by the measurement equipment 73 during a stationary period of the drill bit 66 (e.g., while new sections of tubing are added to the drill string 30). In another example, the new survey feedback may be provided to the trajectory control system 90 periodically when the measurement equipment 73 provides continuous survey feedback during the drilling operations.

Figure 3:
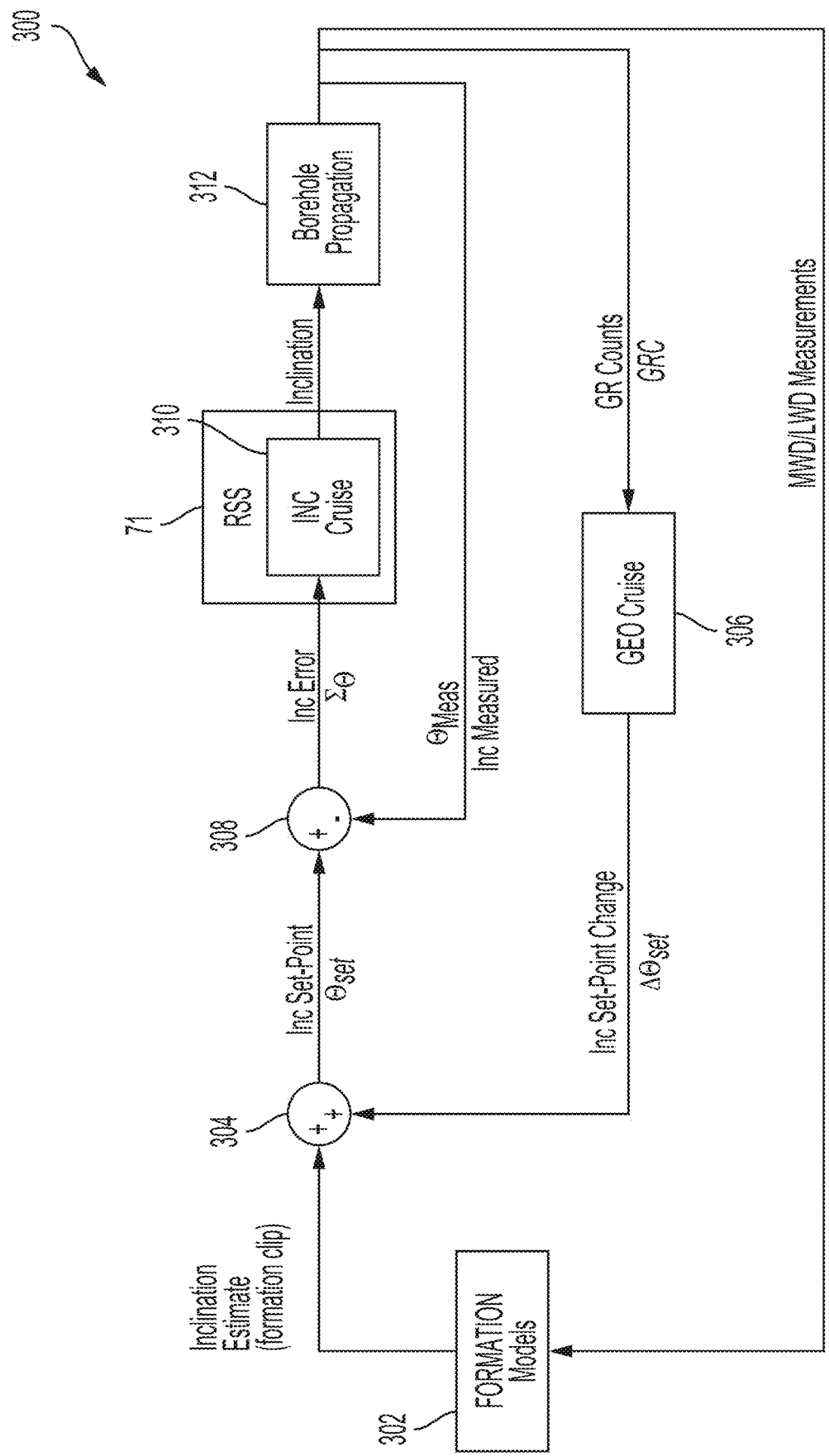
FIG. 3 depicts a block diagram of an inclination control loop of the rotary steerable system using azimuthal gamma-ray counts according to one aspect of the present disclosure.

FIG. 3 depicts a block diagram of an inclination control loop 300 of the rotary steerable system 71 using azimuthal gamma-ray counts according to one aspect of the present disclosure. Logic of the inclination control loop 300 may be performed by the trajectory control system 90, which may be located along the bottom hole assembly 64 or at the surface 16 of the wellbore 12. A geological cruise control module 306 may use azimuthal gamma-ray counts to provide a corrective set-point change in an inclination of the drill bit 66.

A target inclination of the drill bit 66 controlled by the rotary steerable system 71 may be received at an adder 304 from a formation model 302. The target inclination (e.g., an inclination or dip angle estimate $\hat{\delta}$) may be determined based on the formation model 302, which may be updated by MWD and LWD measurements available in real-time. If determined at the surface 16 of the wellbore 12, the target inclination may be downlinked to the rotary steerable system 71 with a telemetry system. In an example, the target inclination may be formulated from the formation model 302 to maintain the drill bit 66 in a pay zone of the formation 14 during the drilling process.

An inclination set-point change may also be received at the adder 304 based on gamma-ray count data received at a geological cruise control module 306 from a gamma-ray detector of the measurement equipment 73. In an example, the gamma-ray count data may be generated from a survey feedback during the drilling operation, and the gamma-ray count data may be used to generate the inclination set-point change. The adder 304 may combine the target inclination with the inclination set-point change to generate a new inclination set-point. In an example, the new inclination set-point may include a set-point for an inclination angle (e.g., in the vertical plane 202) of the drill bit 66.

As a feedback input, the inclination control loop 300 may use azimuthal gamma sensor measurements. The azimuthal gamma sensor measurements may provide high-side and low-side gamma-ray counts (HS-GRC and LS-GRC, respectively). The HS-GRC may represent gamma-ray counts received on an upper-half of the wellbore 12, and the LS-GRC may represent gamma-ray counts received on a lower-half, as described below with respect to FIG. 14. While the feedback is described in terms of HS-GRC and LS-GRC, a greater number of azimuthal sector measurements may also be collected. For example, the azimuthal gamma sensor measurements may be measured for quadrants, octants, hexadecants, etc.

A control logic (e.g., the geological cruise control module 306) may use the HS-GRC and the LS-GRC feedback to determine an inclination set-point change $\Delta\Theta_{Set}$. The inclination set-point change may be added to the target inclination at the adder 304 as a corrective term to adjust an inclination set-point $\Theta_{Set}$. The inclination set-point change may ensure that the drill bit 66 remains within the target formation based on the HS-GRC and the LS-GRC feedback.

To determine the inclination set-point change, the geological cruise control module 306 may determine a difference between the HS-GRC and the LS-GRC feedback (e.g., $\Delta$GRC) using a statistically significant confidence metric, as discussed below with respect to FIGS. 8-18. The geological cruise control module 306 may also compare a current set of gamma measurements to those of the well plan or stratigraphic model (e.g., a predicted log). Based on the difference and the comparison to the predicted log, the inclination set-point change may be determined to maintain the drill bit 66 toward a center portion of the target formation.

The new inclination set-point may be provided from the adder 304 to a subtractor 308. The subtractor 308 also receives a measured inclination $\Theta_{Meas}$ from a prior survey feedback measurement by one or more measurement equipment 73. In an example, the measurement equipment 73, such as MWD tools, provide an indication of the inclination of the drill bit 66. An inclination error may be generated by the subtractor 308 by subtracting the measured inclination from the new inclination set-point. This inclination error may be provided to an inclination cruise control 310 of the rotary steerable system 71 to maintain the new inclination set-point such as inclination angle of the drill bit 66.

Borehole propagation 312 may occur using the new inclination set-point, and the measurement equipment 73 may take new measurements with a subsequent survey feedback. The subsequent survey feedback by the measurement equipment 73 may provide the inclination measurements to the subtractor 308, the GRC measurements to the geological cruise control module 306, and MWD measurements and LWD measurements to the formation model 302. When the formation model 302 receives the new measurements from the measurement equipment 73, the formation model 302 may be updated, and a new target inclination may be generated by the formation model 302.

Figure 4:
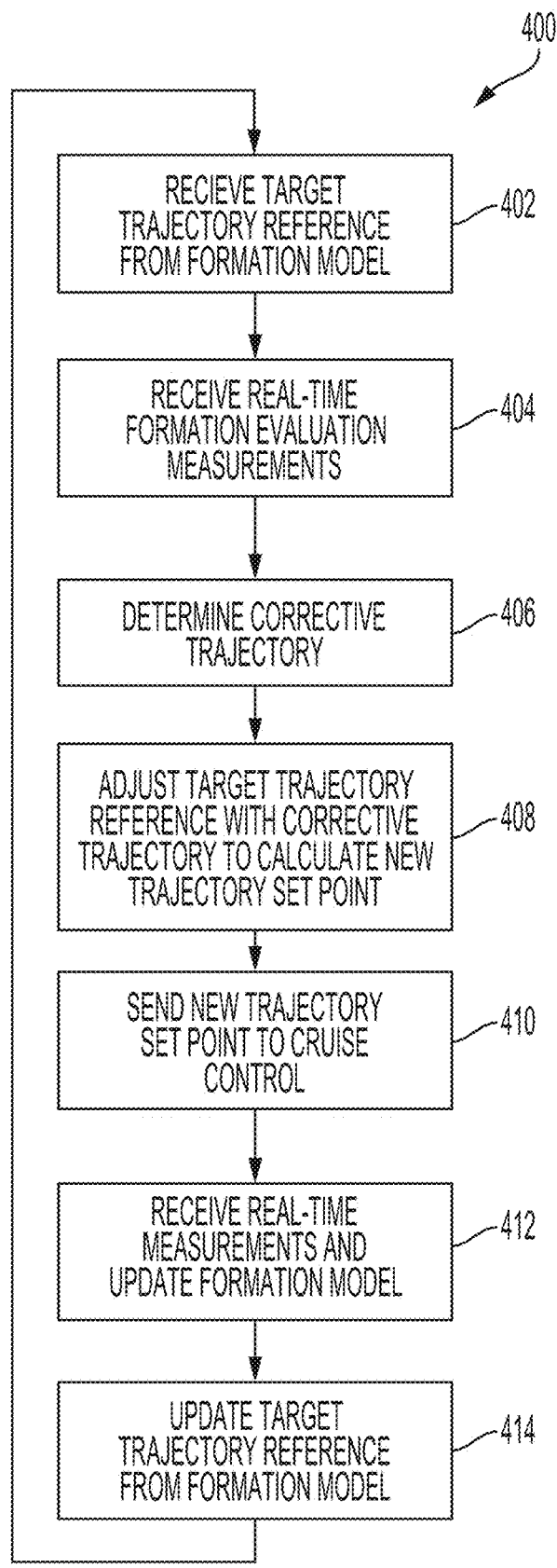
FIG. 4 is a flowchart describing a process for controlling the rotary steerable system according to one aspect of the present disclosure.

FIG. 4 is a flowchart describing a process 400 for controlling the rotary steerable system 71 according to one aspect of the present disclosure. For illustrative purposes, the process 400 is described with reference to certain examples depicted in the figures. Other implementations, however, are possible.

At block 402, the process 400 involves receiving a target trajectory reference from the formation model 302. The target trajectory reference may provide a reference attitude that includes inclination and azimuth for the drill bit 66 at a particular location within the wellbore 12. Further, the target trajectory reference may be selected to maintain the drill bit 66 within a target formation based on the updateable formation model 302.

At block 404, the process 400 involves receiving real-time formation evaluation measurements. The real-time formation evaluation measurements may come from survey feedback performed by the measurement equipment 73. For example, FEWD measurements, such as gamma-ray counts, taken by the measurement equipment 73 may be received by the geological cruise control module 306.

At block 406, the process 400 involves determining a corrective trajectory from the real-time formation evaluation measurements received at block 404. For example, the formation evaluation measurements may indicate inconsistencies between the formation model 302 and the formation as measured by the measurement equipment 73. In such an instance, the geological cruise control module 306 may generate a trajectory set-point change that corrects the target trajectory reference. In an example, the trajectory set-point change may be an indication of a change of the inclination angle, the attitude angle, or both of the target trajectory reference. In one example when the trajectory is on plan and on target, the current plan or trajectory is maintained. In another example, when the trajectory is deviating from plan or target, feedback is provided to adjust the drilling parameters and formation model, and a modified real-time gamma log can be generated according to the adjustments.

At block 408, the process 400 involves adjusting the target trajectory reference with the corrective trajectory such as the trajectory set-point change to calculate a new trajectory set-point of the drill bit 66. The new trajectory set-point may be used by the rotary steerable system 71 to control the trajectory of the drill bit 66 during a drilling operation.

At block 410, the process 400 involves sending the new trajectory set-point to an inclination cruise control 310 of the rotary steerable system 71. The inclination cruise control 310 may use the new trajectory set-point to maintain an attitude of the drill bit 66 during the drilling operation. In an example, the rotary steerable system 71 may control the drill bit 66 to continue drilling the wellbore 12 using the new trajectory set-point that is a function of the target trajectory reference and the measured trajectory of the drill bit 66.

At block 412, the process 400 involves receiving real-time measurements and updating the formation model 302 based on the real-time measurements. In an example, the real-time measurements may indicate that the formation 14 differs from the formation model 302. Using this indication, the formation model 302 may be updated to reflect the real-time information associated with the formation 14. The real-time measurements may be from FEWD tools, MWD tools, LWD tools, or any other formation measurement.

At block 414, the process 400 involves updating the target trajectory reference using the updated formation model 302. For example, the changes to the formation model 302 based on the real-time measurements may result in a target trajectory reference change to maintain the drill bit 66 within the target formation. The process 400 may then repeat at block 402 and continue in this manner until the drilling operation is completed.

In an example, blocks 402-410 may take place downhole at the rotary steerable system 71 within the wellbore 12, while blocks 412 and 414 take place at a surface of the wellbore 12. In another example, blocks 402-414 may all take place at the rotary steerable system 71 within the wellbore 12. In an additional example, blocks 402-414 may all take place at a surface of the wellbore 12.

Figure 5:
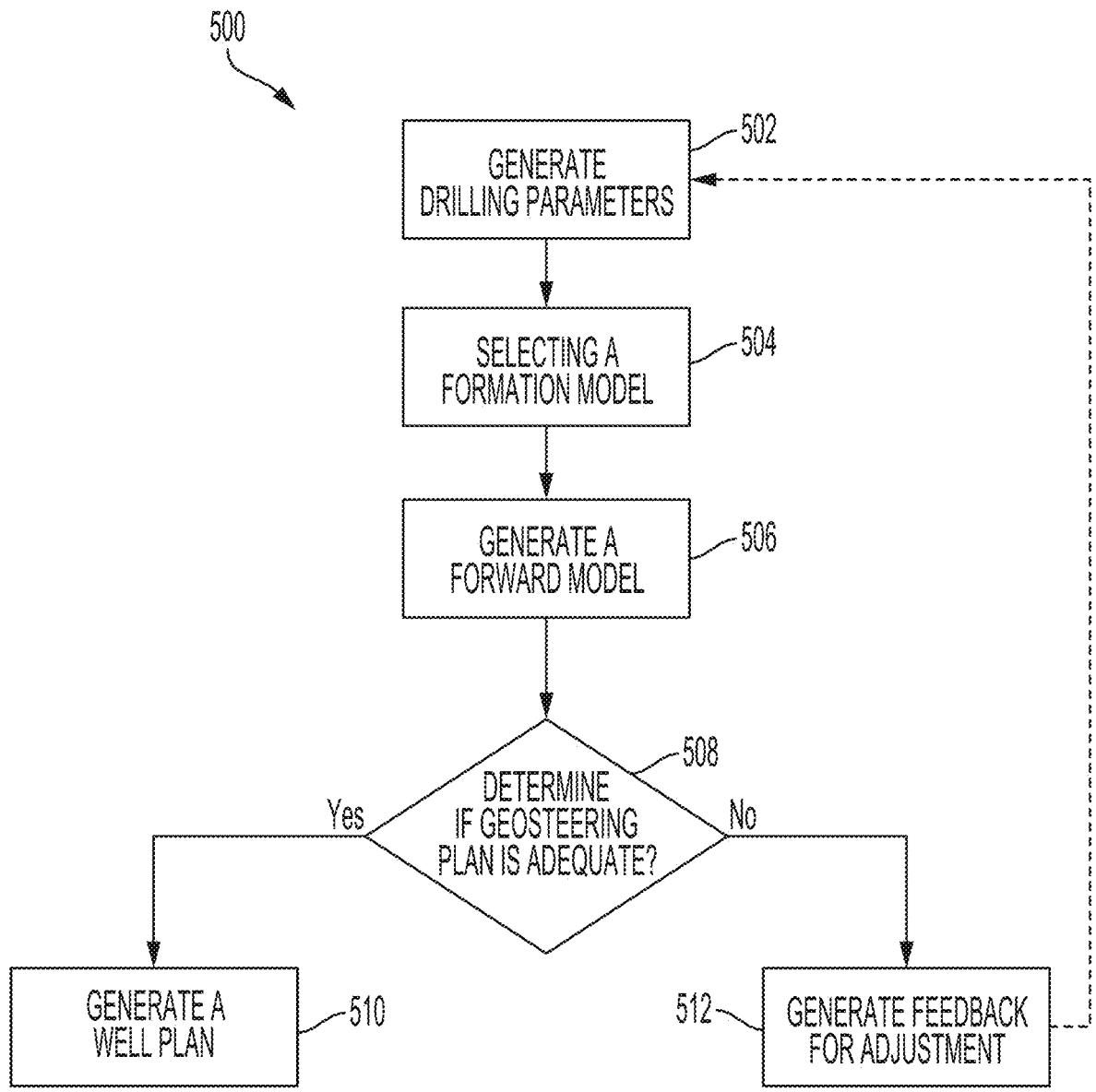
FIG. 5 is a flowchart describing a process for generating a well plan according to one aspect of the present disclosure.

FIG. 5 is a flowchart describing a process 500 for generating a pre-job well plan according to one aspect of the present disclosure. For illustrative purposes, the process 500 is described with reference to certain examples depicted in the figures. Other implementations, however, are possible.

At block 502, the process 500 involves generating a set of drilling parameters. In one example, the set of drilling parameters may be received as input parameters for desired characteristics of the drilling operation. The set of drilling parameters may include parameters for controlling a trajectory of the bottom hole assembly 64. The set of drilling parameters may additionally or alternatively include a rate of penetration during the drilling operation. Other drilling parameters may include tool-specific characteristics (e.g., operating characteristics of each tool). For instance, the tool-specific characteristics may include measurement precision, front-to-back ratio (FBR), and some derived parameters, such as minimum detectable contrast (MDC). Each tool type may have a specific, fixed set of these parameters. Further, a reference target trajectory may be selected to maintain the drill bit 66 within a target formation based on a formation model. While not shown in FIG. 5, some examples may include selecting a gamma ray tool prior to block 502. In an example that includes selecting the gamma ray tool, The process 500 can provide feedback for additional selection of gamma ray tools.

At block 504, the process 500 involves selecting a formation model. A formation model may include a stratigraphic map from offset wells or geological models. The formation model may include the bed activity, which is a measure of the relative amount of radioactive material present. The formation model may be selected from a plurality of formation models based on geographic location, geological survey data, and desired well plan characteristics.

At block 506, the process 500 involves generating a forward model using the formation model, the drilling parameters, and the tool-specific characteristics. The forward model may provide a prediction of a tool output (e.g., a well plan log curve). Statistical predictions of the detection limits that an azimuthal GR tool could achieve may be determined in any given combination of formation model, drilling parameters, and the tool-specific characteristics. Thus, a drilling and geosteering plan can be evaluated to determine whether the well plan meets criteria for generating a well plan.

At block 508, the process 500 involves determining whether the drilling and geosteering plan meets criteria for generation of a well plan. For instance, the drilling and geosteering plan can be assessed to determine whether the predicted log is adequate for making geosteering decisions in an operational well plan. In an example, the criteria for adequacy may be a confidence of distinguishing between an upper bed and lower bed, and thereby a confidence in determining a trajectory change based on distinguishing between the upper bed and the lower bed. When the predicted log is adequate, then response requirements are met and the process 500 proceeds to block 510. When the predicted log fails to be adequate and meet the criteria, then the process 500 proceeds to block 512. Further details may be described with regard to FIGS. 11-12.

Geosteering may be simplified mathematically to a prediction of separation between azimuthal GR curves (e.g., a high-side curve and a low-side curve) when approaching or passing a bed boundary in a two-bed formation model. In an example, a bed boundary may exist at a location where the formation 14 transitions from one bed layer to another bed layer. For example, where the formation 14 transitions from an oil and gas rich target formation to a neighboring formation with less or limited quantities of oil and gas. Separation may give an indication of a steering direction change, even in the simplest case of only up- and down-facing GR curves. A method may solve a steering question in seconds with only two factors or equivalents: (1) measurement precision; and (2) front-to-back ratio. The measurement precision is an indication of an uncertainty of the measurement. The precision can be expressed as a standard deviation, $\sigma$, as discussed below with respect to FIG. 9.

Theoretical up (high side) and down (low side) facing readings of an azimuthal GR tool can be forward-modeled accurately from a front-to-back ratio for any formation changes. After combining with measurement precision, effects of counting statistics may be added to a model to mimic the real world log curves, especially at a pre-selected stratigraphic marker. A tool model may come from the characterization of a measurement tool, which is governed by the measurement physics. A formation model can be derived from either offset wells or from geological models, and the formation model may be used to define stratigraphic markers. The gamma measurement and data quality may be determined by the tool design, the formation properties, and the drilling parameters, such as a drilling rate of penetration (ROP) and trajectory. This information can be used to create a forward model that outputs a predicted tool response. The forward model can be inverted to convert the downhole, measured log into the actual formation structures that are present in the formation model. The actual and measured activities may be different due to shielding, or tool geometry that is used to make the detector azimuthally sensitive, resulting in measurement inaccuracies. For example, the shielding may permit some gamma rays that originate from the formation located "behind" the detector.

In some examples, the predicted log is analyzed to determine whether the predicted log will distinguish a boundary between the upper and lower bed over a specific number of points. For example, the confidence of distinguishing the boundary may be measured as a fraction of points for which there is a definitive prediction over a total number of points for which predictions are made.

Quantitative measurements of a confidence or probability of a bed boundary existence may be included in some examples of the present techniques. These quantitative measurements can be fed to a real-time manual or automated geosteering modality.

Inclusion of measurement physics may be an improvement over-reliance on geometrical based control. The measurement physics may include a statistical nature of nuclear counting (e.g., gamma-ray counting) statistics and a derivation of a front-to-back ratio. The front-to-back ratio, as used herein, may be a factor that represents the measurement physics of the tool. The front-to-back ratio may be a measure of azimuthal sensitivity. In an example, the front-to-back ratio may be defined as a ratio of (i) a gamma-ray measurement when a gamma-ray detector is facing a first bed and (ii) a gamma-ray measurement when the gamma-ray detector is facing a second bed. An overall coverage chart can be pre-calculated as a quick look-up reference to measure the effectiveness of azimuthal GR. In an example, the chart may reflect the detection limits that an azimuthal GR tool can resolve for geosteering in a 0-200 American Petroleum Institute (API) unit sampling space at a certain confidence level. Other sampling spaces may also be used (e.g., greater than 200 API).

In a two-bed model, when a top bed is $H_{API}$ and a bottom bed is $L_{API}$, the front reading (HS_GR) and back reading (LS_GR) of the gamma-ray tool can be predicted using the following equations:

$$\text{HS\_GR} = H_{API}\frac{R}{R+1} + L_{API}\frac{1}{R+1} \quad \text{(Equation 1)}$$

$$\text{LS\_GR} = H_{API}\frac{1}{R+1} + L_{API}\frac{R}{R+1} \quad \text{(Equation 2)}$$

Where R is the front-to-back ratio of a specific tool. Other related attributes may also measure the azimuthal sensitivity, and different equations may be used if other attributes are used.

The forward model may be deterministic. In an example, the forward model may provide a prediction of a tool output (i.e., a real-world log curve). The forward model may use tool-specific physics (e.g., a tool characterization parameter or set of tool-specific parameters), formation model, and drilling parameters to formulate this prediction. The forward model may run very fast. Various scenarios may be evaluated quickly with the forward modeling during the pre-job planning or in real-time during a drilling operation. Statistical predictions of the detection limits that an azimuthal GR tool could achieve at various confidence levels (e.g., 95% possibility of up/down curve separation) may be determined in any given scenario. Thus, the drilling and geosteering plan could be optimized to confidently reach the best rate of penetration without compromising steering capability.

Also in real-time, when a potential separation of up- and down-facing azimuthal GR curves appear on the log, inversion of the model, or an inverse model, may be carried out to derive the possibility that this separation truly reflects formation changes and to offer quantitative insight to make steering decisions. For example, a steering change may be made when a determination is made that an undesirable formation change is present in the drilling path, and a steering change may not be made when a determination is made that the undesirable formation change is not present. Inversion of the modeling may also be investigated to help recover the true API values of the formation beds and enhance detection of bed boundary positions. The modeling and inversion can be done on surface to assist the driller's decision making. Because of the deterministic nature of the modeling and inversion, these techniques may also be implemented on downhole equipment and combined with other formation or directional measurements to reach drilling automation At block 510, the process 500 involves generating a well plan. In one example, an expected log, formation model, and drilling parameters may be stored in a well plan storage device. The well plan may be received by the geological cruise control module 306 during a drilling operation and used as described with regard to FIG. 4.

At block 512, the process 500 involves providing feedback to adjust the drilling parameters, the formation model, or the gamma tool choice. In one example, the feedback may be provided by a notification on a user interface prompting a modification of well parameters. In another example, the process 500 may be restarted to request anew set of drilling parameters, a different formation model, or a different gamma tool. In some examples, feedback can also be provided after a drilling operation. For instance, the process can analyze the actual gamma-ray activity generated from the inverse model and compare a gamma-ray variance of the actual gamma-ray activity from the predicted values of high-side gamma-ray counts and low-side gamma-ray counts. The process can also determine, using the gamma-ray variance, reservoir properties based on a comparison of an actual tool response and the forward model of the tool response.

Figure 6:
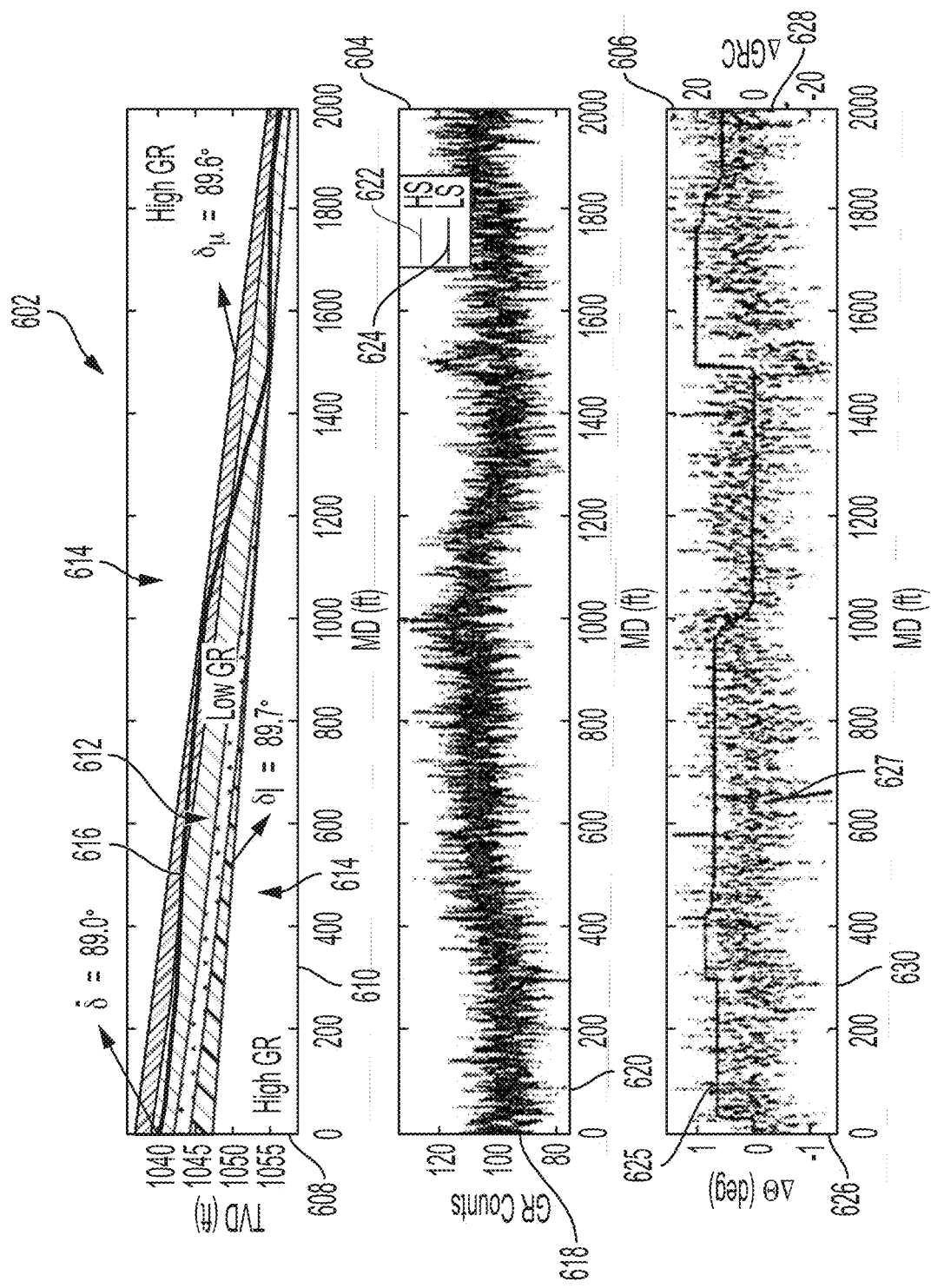
FIG. 6 is a set of graphs demonstrating inclination control within a target formation according to one aspect of the present disclosure.

Some examples of the present techniques provide a sensor or tool-specific characterization with an ability to detect activity contrast such as a difference in activity of two bounding beds. Additionally, some examples may include a sensor or tool-specific forward model for predicting tool response. Some of the examples may also include a sensor or tool-specific inversion methodology for computing actual bed activities from measurements that can be implemented in real-time. The techniques may also provide a sensor or tool-specific optimization of drilling ROP that provides optimized steering performance of a drill bit. The ROP and activity of the formation beds may affect the measurement precision and number of samples per foot. This may affect the ability of a sensor to distinguish one bed from another, assuming they have different activities. Therefore, if the log produced in a specific stratigraphic location is inadequate, the well plan can be optimized by modifying the ROP or by switching to a different type of gamma tool. FIG. 6 is a set of graphs 602, 604, and 606 demonstrating inclination control within a target formation according to one aspect of the present disclosure. The graph 602 depicts a true vertical depth (TVD) of the wellbore 12 on a vertical axis 608 and a measured depth (MD) on a horizontal axis 610. A target bed 612, such as the target formation in the graph 602 is represented as a slightly heterogeneous formation with gamma-ray counts that are relatively lower than neighboring formations 614. As illustrated, a trajectory 616 of the wellbore 12 is controlled to stay within the target bed 612 based on the gamma-ray counts received at the measurement equipment 73. For example, the geological cruise control module 306 may correct the trajectory 616 when the difference between HS-GRC and LS-GRC is greater than a threshold, which would indicate that the drill bit 66 is nearing a boundary between the target bed 612 and the neighboring formations 614.

The graph 604 depicts gamma-ray counts on a vertical axis 618 and the measured depth (MD) on a horizontal axis 620. The gamma-ray counts are provided for both a high side 622 and a low side 624 of the gamma-ray detector 600.

The graph 606 depicts an inclination set-point change 625 on a first vertical axis 626, a difference 627 between the HS-GRC and LS-GRC on a second vertical axis 628, and the measured depth (MD) on a horizontal axis 630. The inclination set-point change 625 may be used by the rotary steerable system 71 to change the trajectory 616 of the drill bit 66 such that the drill bit 66 remains within the target bed 612 during a drilling operation.

While FIGS. 3-6 describe inclination control using azimuthal gamma-ray measurements, left-side gamma-ray counts and right-side gamma-ray counts at a gamma-ray detector may also be used to generate azimuth set-point changes of the drill bit 66. That is, the drill bit 66 may also be controlled in the lateral plane 204 using the gamma-ray count measurements. In such an example, a drilling direction may be used as a reference, and corrective set-point changes may be applied to the drilling direction as a change to the drilling direction. The corrective set-point changes for the azimuth may be based on a difference between the right-side gamma-ray counts and the left-side gamma-ray counts in a manner similar to the inclination set-point changes described above.

For example, the trajectory control system 90 can determine the drilling direction of the drill bit through the formation model using the forward model of the bed boundary. The trajectory control system 90 can predict left-side gamma ray counts and right-side gamma ray counts based on the drilling direction of the drill bit using the forward model. The trajectory control system may adjust the drilling direction by applying a corrective set point based on the left-side gamma ray counts and the right-side gamma ray counts similar to adjusting inclination set point.

Figure 7:
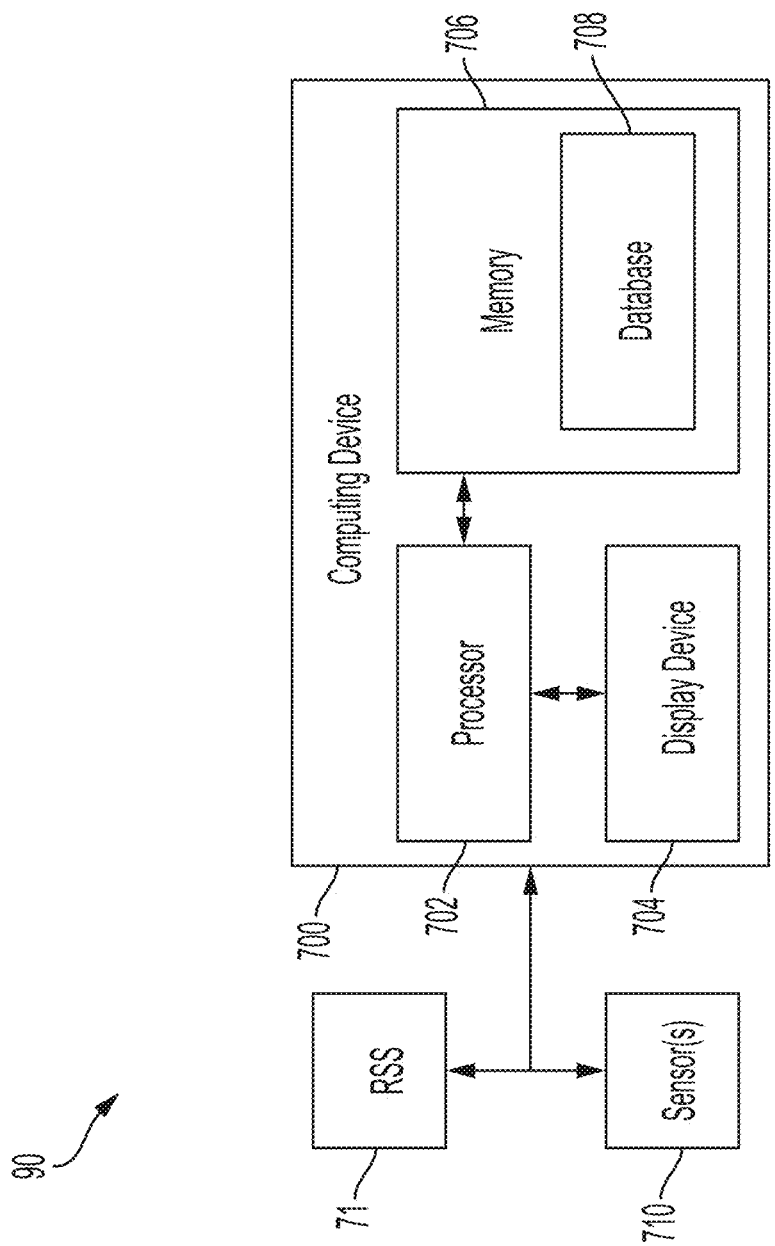
FIG. 7 is a block diagram of the trajectory control system according to some examples of the present disclosure.

FIG. 7 is a block diagram of the trajectory control system 90 according to some examples of the present disclosure. The trajectory control system 90 can include a computing device 700 having a processor 702, a display device 704, and a memory 706. In some examples, the components shown in FIG. 7 (e.g., the processor 702, the display device 704, and the memory 706) can be integrated into a single structure. For example, the components can be within a single housing. In other examples, the components shown in FIG. 7 can be distributed (e.g., in separate housings) and in electrical communication with each other.

Sensor(s) 710 can be communicatively coupled to the computing device 700 to transmit information about the location of the drill bit 66 within the wellbore 12 and information about the formation 14 surrounding the drill bit 66. Examples of the sensors 710 can include measurement-while-drilling (MWD) sensors, logging-while-drilling (LWD) sensors, gamma-ray detectors, resistivity sensors, or any other sensors useable to measure formation properties and position and attitude of the drill bit 66. In an example, the sensors 710 may be arranged as part of the rotary steerable system 71 (e.g., integrated within the rotary steerable system 71). In another example, the sensors 710 may be separate from, but communicatively coupled to, the rotary steerable system 71.

The processor 702 can execute one or more operations for implementing some examples. The processor 702 can execute instructions stored in the memory 706 to perform the operations. The processor 702 can include one processing device or multiple processing devices. Non-limiting examples of the processor 702 include a Field-Programmable Gate Array ("FPGA"), an application-specific integrated circuit ("ASIC"), a microprocessor, etc.

The processor 702 can be communicatively coupled to the memory 706 via a bus. The non-volatile memory 706 may include any type of memory device that retains stored information when powered off. Non-limiting examples of the memory 706 include electrically erasable and programmable read-only memory ("EEPROM"), flash memory, or any other type of non-volatile memory. In some examples, at least some of the memory 706 can include a medium from which the processor 702 can read instructions. A computer-readable medium can include electronic, optical, magnetic, or other storage devices capable of providing the processor 702 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The memory 706 can include a database 708, which can include any amount and combination of the content described in previous examples. The database 708 can store 3D mappings of well plans, mathematical equations used for generating wellbore trajectory error, data generated from the measurement equipment 73, or any combination of these, among other things.

The display device 704 can receive display signals from the processor 702 and responsively output any information related to the wellbore trajectory or any other information useable to manage wellbore drilling operations. One example of the display device 704 can include a liquid crystal display. Further, the rotary steerable system 71 can receive inclination and azimuth set-point changes from the processor 702 to provide a new trajectory for the drill bit 66 controlled by the rotary steerable system 71.

The trajectory control system 90 may analyze the information about the wellbore received from sensors 710 and determine whether any change to the wellbore trajectory is needed based on comparing the information received from sensors 710 with threshold values. The trajectory control system 90 can adjust the trajectory based on information received from sensors 710.

Figure 8:
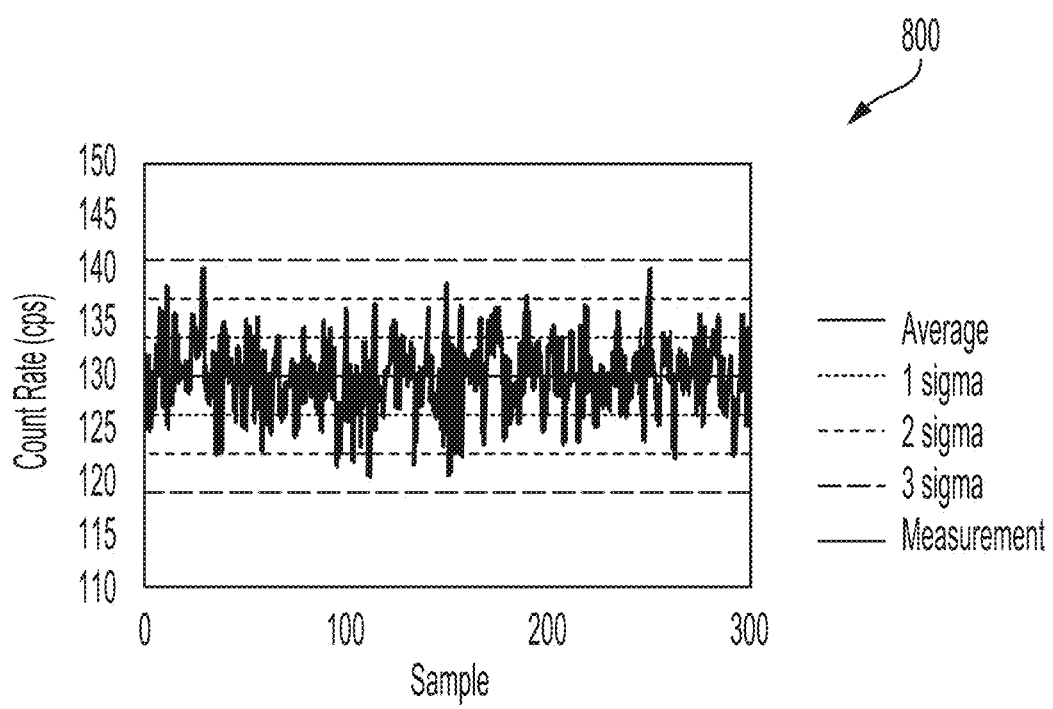
FIG. 8 is a graph demonstrating a gamma-ray measurement distribution for an average of 130 counts per second according to one aspect of the present disclosure.

FIG. 8 is a graph 800 demonstrating a gamma-ray measurement distribution for an average of 130 counts per second according to one aspect of the present disclosure. The graph 800 also includes indications of three standard deviations surrounding the average of 130 counts per second. For an average count rate R, $\sigma=\sqrt{R/\Delta t}$ where $\Delta t$=accumulation time. 68.26% of the measurements fall within one standard deviation $\sigma$, 95.44% of the measurements fall within two standard deviations $2\sigma$, and 99.75% within three standard deviations $3\sigma$. As illustrated, one standard deviation includes measurements within 3.61 cps from the 130 cps average, two standard deviations include measurements within 7.21 cps from the 130 cps average, and three standard deviations include measurements within 10.82 cps from the 130 cps average. The trajectory control system can use gamma-ray measurements to analyze and determine general statistics of the distribution. The trajectory control system 90 can be used to determine presence of a particular bed boundary or a separation of two beds based on analyzing the statistics of each distribution.

Figure 9:
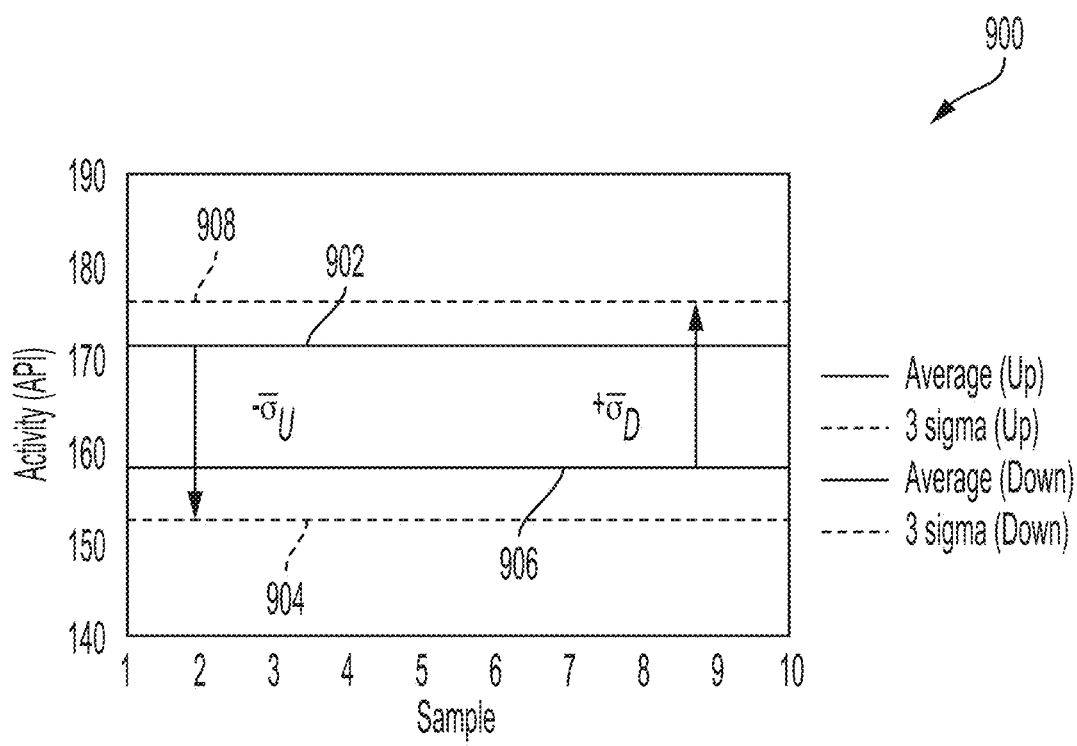
FIG. 9 is a graph demonstrating a gamma-ray statistical analysis with an upper bed average that is greater than a lower bed average according to one aspect of the present disclosure

FIG. 9 is a graph 900 demonstrating a gamma-ray measurement distribution according to one aspect of the present disclosure. Average hemispherical measurements are average gamma-ray counts at the upper hemisphere of a gamma-ray tool 902 and average gamma-ray counts at the lower hemisphere of the gamma-ray tool 906. Also shown are the upper and lower hemisphere standard deviations, such as upper hemisphere deviation 904 and lower hemisphere deviation 908. As illustrated in FIG. 9, the upper and lower hemisphere deviations represent a three standard deviation difference from the respective average. In the illustrated example, an upper bed has greater gamma-ray activity (e.g., greater gamma-ray counts) than a lower bed. The trajectory control system can determine a separation between an upper bed and a lower bed based on general statistics of the gamma-ray measurements. In the example illustrated by FIG. 9, the separation of the upper bed average and the lower bed average is less than three sigma deviation from the average. In other examples, different sigma values can be used to distinguish between bed averages. In some examples, the confidence of bed boundary accuracy can be affected by a number of sigma values that separate the bed averages. For instance, the confidence of bed boundary accuracy may increase as the sigma value increases.

Figure 10:
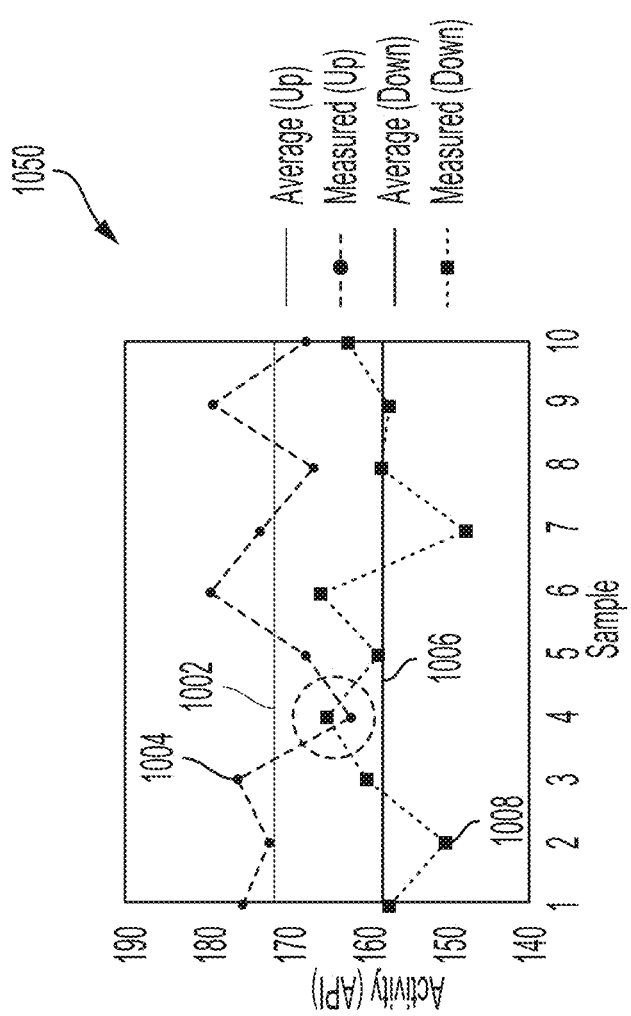
FIG. 10 is a graph demonstrating the average hemispherical gamma-ray measurements and the actual hemispherical gamma-ray measurements according to one aspect of the present disclosure.

FIG. 10 is a graph 1050 demonstrating the average hemispherical gamma-ray measurements and the actual hemispherical gamma-ray measurements according to one aspect of the present disclosure. An upper hemisphere average 1002 and a lower hemisphere average 1006 are depicted along with actual measurements over a group of samples. As illustrated, the upper hemisphere measurement 1004 and lower hemisphere measurement 1008 overlap at sample number 4. Generally, a resolution of bed boundaries requires confidence that each upper bed measurement will be greater than each lower bed measurement. Thus, a quantitative measure of confidence that the upper bed measurement will be greater than the lower bed measurement may be determined. The quantitative measurement of confidence may be used to determine azimuthal performance such as a maximum detectable lower activity bed and a minimum detectable contrast.

Figure 11:
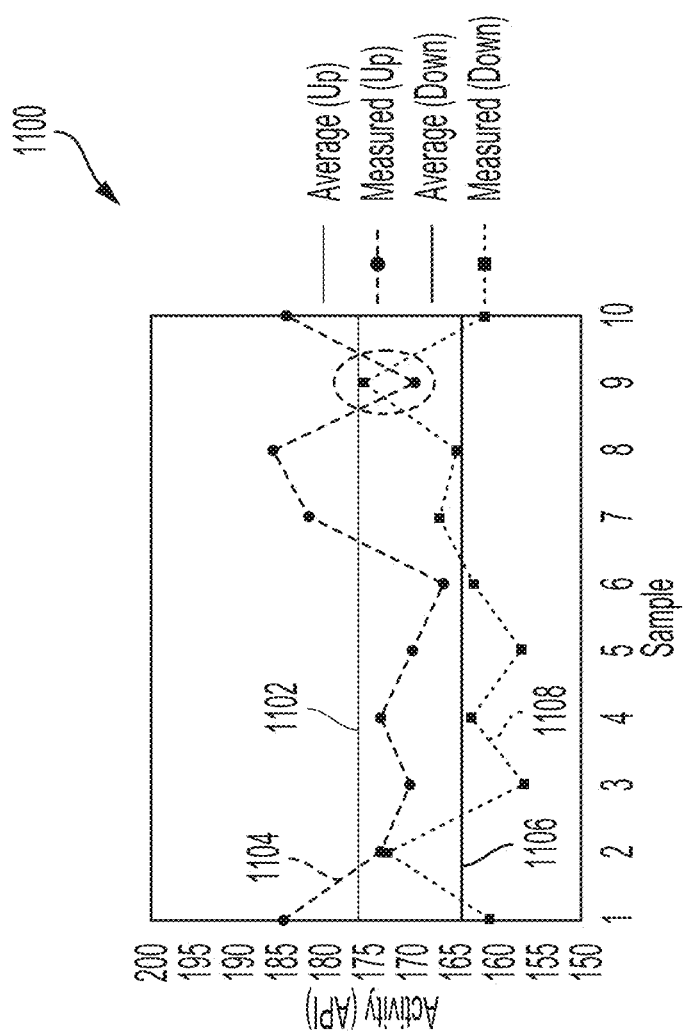
FIG. 11 is a graph demonstrating actual hemispherical gamma-ray measurements when the average upper hemispherical gamma-ray measurements are greater than the average lower hemispherical gamma-ray measurements according to one aspect of the present disclosure.

FIG. 11 is a graph 1100 demonstrating actual hemispherical gamma-ray measurements when the average upper hemispherical gamma-ray measurements, depicted by line 1102, are greater than the average lower hemispherical gamma-ray measurements, depicted by line 1106, according to one aspect of the present disclosure. The measured upper hemisphere curve 1104 shows values of the actual upper hemispherical gamma-ray measurements. The measured lower hemisphere curve 1108 shows values of the actual lower hemispherical gamma-ray measurements. Because only a single sample point of the ten sample points overlaps, the confidence that the trajectory control system can distinguish between the upper bed and lower bed is 0.9 or 90%.

Figure 12:
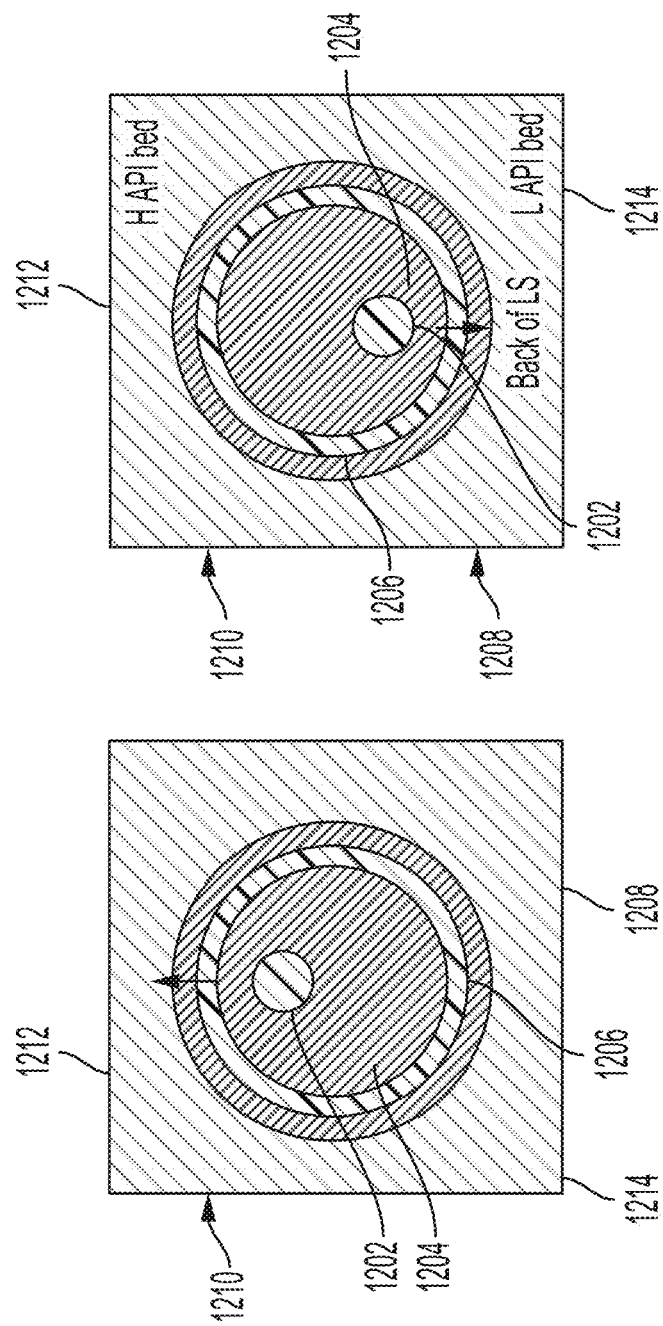
FIG. 12 is an example of a hemispherical gamma-ray tool positioned between an upper bed with greater gamma-ray activity and a lower bed with lesser gamma-ray activity according to one aspect of the present disclosure.
Figure 13:
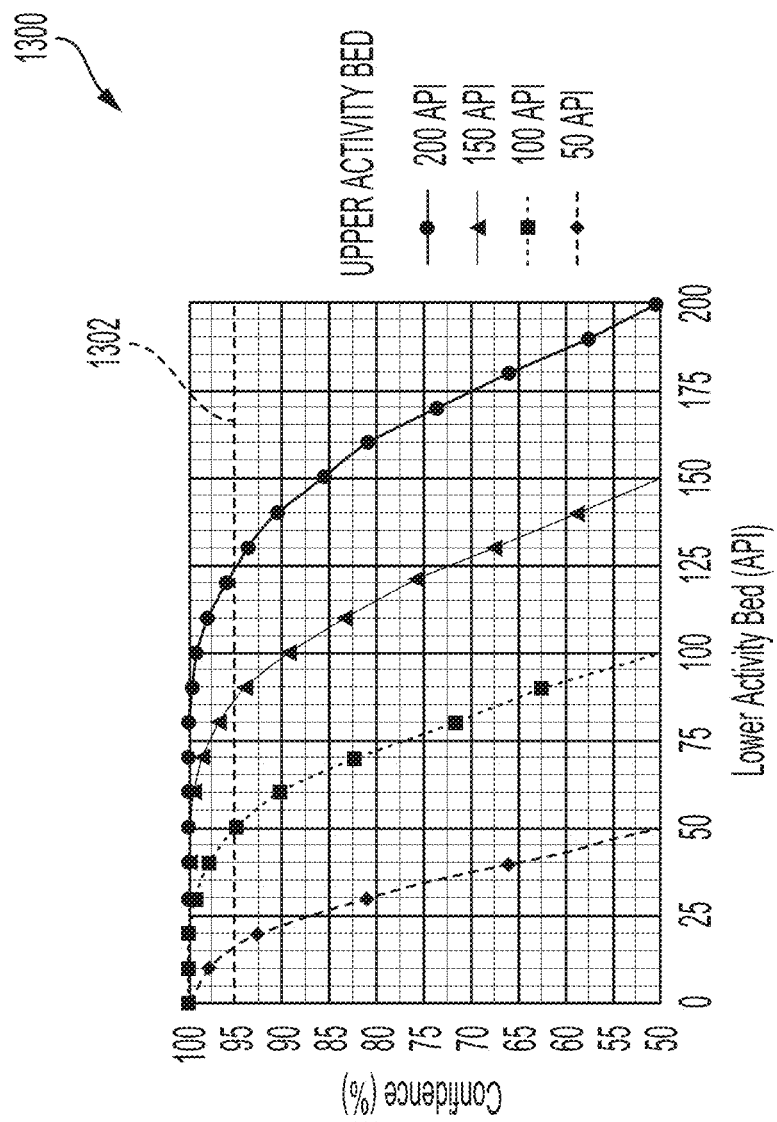
FIG. 13 is a graph demonstrating confidence measurements for various upper and lower bed API differences according to one aspect of the present disclosure.

FIG. 12 is an example of a hemispherical gamma-ray tool 1200 positioned between an upper bed 1210 with greater gamma-ray activity and a lower bed 1208 with lesser gamma-ray activity. The hemispherical gamma-ray tool may include a gamma-ray sensor 1202, a tool body 1204, and a collar 1206. In the example of FIG. 13, the gamma-ray sensor 1202 is offset from a center of the tool body 1204. The offset positioning of the gamma-ray sensor 1202 within the tool body 1204 enables a bias of the front portion of the gamma-ray sensor 1202 to the back of the gamma-ray sensor 1202. In an additional or alternative embodiment, the hemispherical gamma-ray tool 1200 may include a shielding element (not illustrated in FIG. 12) that is disposed around a portion of the tool body 1204. The shielding element can provide a bias to the gamma-ray sensor 1202 without offsetting the gamma-ray sensor 1202 from the center of the tool body 1204. A location of a high side 1212 and a low side 1214 may be aligned with the inclination of the drill bit.

FIG. 13 is a graph 1300 demonstrating confidence measurements for various upper and lower bed API differences according to one aspect of the present disclosure. As illustrated in FIG. 13, a line 1302 depicts a 95% confidence threshold. The confidence measurements may be indicative of a bed crossing of the drill bit 66 and a quality factor. The quality factor may be a function of a "confidence" indication. The greater the confidence, the better the quality of the measurement. For example, the line representing upper bed activity at 200 API provides a sufficient confidence level, such as greater than 95% confidence, for a lower bed activity up to approximately 125 API. In contrast, the line representing upper bed activity at 50 API may only provide a sufficient confidence level for a lower bed activity up to approximately 15 API.

Figure 14:
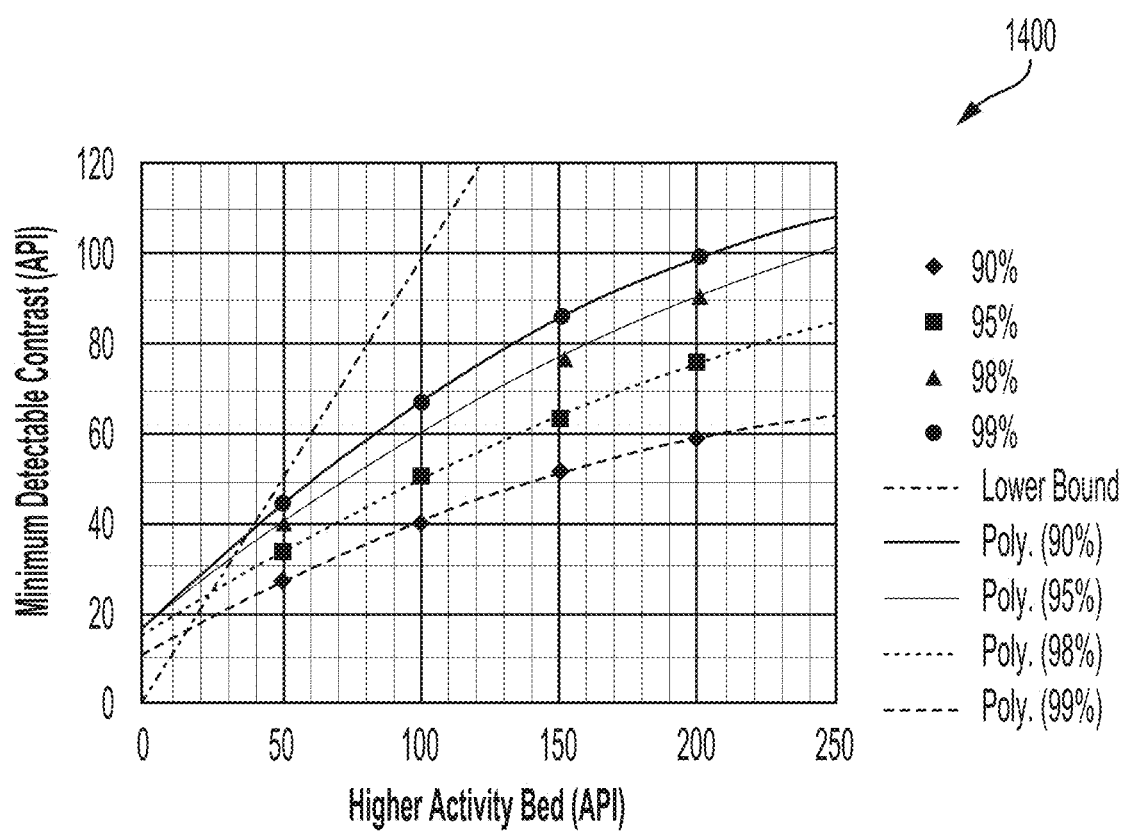
FIG. 14 is a graph demonstrating a minimum detectable contrast in API over a higher activity bed API for varying confidence thresholds according to one aspect of the present disclosure.

FIG. 14 is a graph 1400 demonstrating minimum detectable contrast in API over a higher activity bed API for varying confidence thresholds according to one aspect of the present disclosure A primary output of the characterizations provided in FIGS. 8-14 is the ability of a specific tool geometry to be able to distinguish between beds with different activities. For example, the examples of FIGS. 8-14 enable a determination of whether the log curves are separated enough to be able to conclude that there are two separate beds present. The lower the front-to-back ratio, the larger the activity contrast must be for the curves to have adequate separation. The "confidence" is a measure of a fraction of points for which the log will correctly indicate that two separate activity beds are being detected. Similarly, a "confidence threshold" is a measure of a percentage of points that are correctly indicated by the gamma log. For example, a gamma log may have a confidence of 95% if a number of points correctly detecting two separate activity beds is 95% of a total number of points. The confidence threshold may be determined based on a requirement of a wellbore. A well plan or drilling operation can be evaluated by measuring the number of points correctly indicated on the gamma log compared to the total number of points.

In some aspects, a method, system, and a computing environment for controlling a wellbore drilling trajectory based on an azimuthal gamma-ray measurements from within a wellbore are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: receiving at least one drilling parameter, at least one tool characterization parameter, and a formation model; generating a forward model of a tool response at a bed boundary between a target formation and a neighboring formation using the at least one drilling parameter, the at least one tool characterization parameter, and the formation model; predicting at least two azimuthal gamma logs using the forward model; determining that a difference between the at least two azimuthal gamma logs generates a confidence level that is greater than a confidence threshold; in response to determining that the difference between the at least two azimuthal gamma logs generates the confidence level that is greater than the confidence threshold, generating a well plan; and outputting a command for controlling a trajectory in directionally drilling a wellbore within a formation associated with the formation model using the well plan.

Example 2 is the method of example 1, further comprising: determining that the difference between the at least two azimuthal gamma logs generates a second confidence level that does not exceed the confidence threshold; providing a request to modify the at least one drilling parameter, the formation model, or both; adjusting the at least one drilling parameter, tool characterization parameter, the formation model, or a combination thereof to generate an adjusted drilling parameter, an adjusted formation model, or both; predicting at least two modified azimuthal gamma logs based on the adjusted drilling parameter, tool characterization parameter, the adjusted formation model, or a combination thereof; determining that a modified difference between the at least two modified azimuthal gamma logs generates a third confidence level that is greater than the confidence threshold; in response to determining that the modified difference between the modified azimuthal gamma log generates the third confidence level that is greater than the confidence threshold, generating a modified well plan; and outputting a command for controlling the trajectory in directionally drilling the wellbore within the formation associated with the adjusted formation model using the modified well plan.

Example 3 is the method of examples 1-2, wherein predicting the at least two azimuthal gamma logs comprises: determining a drilling direction of a drill bit through the formation model using the forward model; predicting a high-side gamma ray reading and low-side gamma ray reading based on the drilling direction of the drill bit; and adjusting the drilling direction by applying a corrective set point based on the high-side gamma ray reading and the low-side gamma ray reading.

Example 4 is the method of example 3, wherein the confidence threshold is a measure of a fraction of predicted points along the drilling direction for which the forward model of the bed boundary correctly indicates that two separate activity beds are being detected.

Example 5 is the method of examples 1-4, wherein generating a forward model using the at least one tool characterization parameter comprises generating a set of tool-specific parameters unique for a specific tool including measurement precision, front-to-back ratio, or a combination thereof.

Example 6 is the method of examples 1-5, wherein drilling the wellbore comprises: receiving a real-time azimuthal gamma log; generating an inverse model using the at least one drilling parameter, the real-time azimuthal gamma log, and the formation model; generating actual formation gamma-ray activity using the inverse model; and steering a drill bit within the formation using the actual formation gamma-ray activity.

Example 7 is the method of example 6, further comprising: generating an updated formation model using the actual formation gamma-ray activity; generating an updated forward model of the bed boundary using the updated formation model; predicting at least two updated azimuthal gamma logs using the updated forward model; determining that an updated difference between the at least two updated azimuthal gamma logs generates an updated confidence level that is greater than the confidence threshold; in response to determining that the updated difference between the at least two updated azimuthal gamma logs generates the updated confidence level that meets the confidence threshold, generating a modified well plan; and outputting a command for controlling the trajectory in directionally drilling the wellbore within the formation associated with the updated formation model using the modified well plan.

Example 8 is a system comprising: a processor; and a non-transitory memory device communicatively coupled to the processor comprising instructions that are executable by the processor to cause the processor to perform operations comprising: receiving a real-time azimuthal gamma log; generating an inverse model using at least one drilling parameter, the real-time azimuthal gamma log, and a formation model; generating actual formation gamma-ray activity using the inverse model; and outputting a command using the actual formation gamma-ray activity for steering a drill bit in directionally drilling a wellbore through a subterranean formation.

Example 9 is the system of example 8, wherein the operations further comprise: receiving at least one drilling parameter, tool characterization parameter, and a formation model; generating a forward model of a tool response at a bed boundary using the at least one drilling parameter, the tool characterization parameter, and the formation model; predicting at least two gamma logs using the forward model; determining that a difference between the at least two gamma logs generates a confidence level that is greater than a confidence threshold; in response to determining that the difference between the at least two gamma logs generates a confidence level that is greater than the confidence threshold, generating a well plan; and wherein steering the drill bit is performed using the well plan.

Example 10 is the system of example 9, wherein the operations further comprise: determining that the difference between the at least two gamma logs generates a second confidence level that does not exceed the confidence threshold; providing a request to modify the at least one drilling parameter, the formation model, or both; adjusting the at least one drilling parameter, the tool characterization parameter, the formation model, or a combination thereof to generate an adjusted drilling parameter, an adjusted tool characterization parameter, an adjusted formation model, or a combination thereof; generating at least two modified gamma logs based on the adjusted drilling parameter, the adjusted tool characterization parameter, the adjusted formation model, or a combination thereof; determining that a modified difference between the at least two modified gamma logs generates a third confidence level that meets the confidence threshold; in response to determining that the modified difference between the at least two modified gamma logs generates the third confidence level is greater than the confidence threshold, generating a modified well plan; and outputting a command for controlling a trajectory in directionally drilling the wellbore within the subterranean formation associated with the adjusted formation model using the modified well plan.

Example 11 is the system of examples 9-10, wherein the operation of generating the forward model using the tool characterization parameter comprises generating a set of tool-specific parameters unique for a specific tool including measurement precision or front-to-back ratio.

Example 12 is the system of examples 9-11, wherein the operation of predicting the at least two gamma logs comprises: determining a drilling direction of a drill bit through the formation model using the forward model; predicting high-side gamma ray readings and low-side gamma ray readings based on the drilling direction of the drill bit; and adjusting the drilling direction by applying a corrective set point based on the high-side gamma ray readings and the low-side gamma ray readings.

Example 13 is the system of example 12, wherein the confidence threshold is a measure of a fraction of predicted points along the drilling direction for which the forward model of the bed boundary correctly indicates that two separate activity beds are being detected.

Example 14 is the system of examples 9-13, wherein the operations further comprise: generating an updated formation model using the actual formation gamma-ray activity; generating an updated forward model of the bed boundary using the updated formation model; predicting at least two updated gamma logs using the updated forward model; determining that an updated difference between the at least two updated gamma logs generates an updated confidence level that is greater than the confidence threshold; in response to determining that the updated difference between the at least two updated gamma logs generates the updated confidence level that meets the confidence threshold, generating a modified well plan; and outputting a command for controlling a trajectory in directionally drilling the wellbore within the formation associated with the updated forward model using the modified well plan.

Example 15 is a non-transitory computer-readable medium that includes instructions that are executable by a processing device to perform operations comprising: receiving at least one drilling parameter, tool characterization parameter, and a formation model; generating a forward model of a tool response at a bed boundary between a target formation and a neighboring formation using the at least one drilling parameter, the tool characterization parameter, and the formation model; predicting at least two gamma logs using the forward model; determining that a difference between the at least two gamma logs generates a confidence level that is greater than a confidence threshold; and in response to determining that the difference between the at least two gamma logs generates the confidence level that is greater than the confidence threshold, generating a well plan.

Example 16 is the non-transitory computer-readable medium of example 15, the operations further comprising: determining that the difference between the at least two gamma logs generates a second confidence level that does not meet the confidence threshold; providing a request to modify the at least one drilling parameter and formation model; adjusting the at least one drilling parameter and formation model to generate an adjusted drilling parameter and an adjusted formation model; generating at least two modified gamma logs based on the adjusted drilling parameter and the adjusted formation model; determining that a modified difference between the at least two modified gamma logs generates a third confidence level that is greater than the confidence threshold; in response to determining that the modified difference between the at least two modified gamma logs generates the third confidence level that is greater than the confidence threshold, generating a modified well plan; and outputting a command for controlling a trajectory in directionally drilling a wellbore within the formation associated with the adjusted formation model using the modified well plan.

Example 17 is the non-transitory computer-readable medium of examples 15-16, wherein the operation of generating the forward model of the bed boundary using the tool characterization parameter comprises generating a set of tool-specific parameters unique for a specific tool including measurement precision, front-to-back ratio, or a combination thereof.

Example 18 is the non-transitory computer-readable medium of examples 15-17, wherein the operation of predicting the at least two gamma logs comprises: determining a drilling direction of a drill bit through the formation model using the forward model of the tool response at the bed boundary; predicting high-side gamma-ray readings and low-side gamma-ray readings based on the drilling direction of the drill bit; and adjusting the drilling direction by applying a corrective set point based on the high-side gamma-ray readings and the low-side gamma-ray readings.

Example 19 is the non-transitory computer-readable medium of examples 15-18, the operations further comprising: receiving a real-time gamma log; generating an inverse model using the at least one drilling parameter, the real-time gamma log, the formation model, or a combination thereof; generating actual formation gamma-ray activity using the inverse model; updating the formation model using the actual formation gamma-ray activity; and steering a drill bit using the actual formation gamma-ray activity.

Example 20 is the non-transitory computer-readable medium of example 19, the operations further comprising: analyzing the actual formation gamma-ray activity generated from the inverse model; determining a gamma-ray variance of the actual formation gamma-ray activity from the predicted values of high-side gamma-ray counts and low-side gamma-ray counts; and determining, using the gamma-ray variance, reservoir properties based on a comparison of an actual tool response and the forward model of the tool response The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   receiving at least one drilling parameter, at least one tool characterization parameter, and a formation model;
   generating a forward model of a tool response at a bed boundary between a target formation and a neighboring formation using the at least one drilling parameter, the at least one tool characterization parameter, and the formation model;
   predicting at least two azimuthal gamma logs using the forward model;
   determining that a difference between the at least two azimuthal gamma logs generates a confidence level that is greater than a confidence threshold;
   in response to determining that the difference between the at least two azimuthal gamma logs generates the confidence level that is greater than the confidence threshold, generating a well plan; and
   outputting a command for controlling a trajectory in directionally drilling a wellbore within a formation associated with the formation model using the well plan.

2. The method of claim 1, further comprising:
   determining that the difference between the at least two azimuthal gamma logs generates a second confidence level that does not exceed the confidence threshold;
   providing a request to modify the at least one drilling parameter, the formation model, or both;
   adjusting the at least one drilling parameter, tool characterization parameter, the formation model, or a combination thereof to generate an adjusted drilling parameter, an adjusted formation model, or both;
   predicting at least two modified azimuthal gamma logs based on the adjusted drilling parameter, tool characterization parameter, the adjusted formation model, or a combination thereof;
   determining that a modified difference between the at least two modified azimuthal gamma logs generates a third confidence level that is greater than the confidence threshold;
   in response to determining that the modified difference between the modified azimuthal gamma log generates the third confidence level that is greater than the confidence threshold, generating a modified well plan; and
   outputting a command for controlling the trajectory in directionally drilling the wellbore within the formation associated with the adjusted formation model using the modified well plan.

3. The method of claim 1, wherein predicting the at least two azimuthal gamma logs comprises:
   determining a drilling direction of a drill bit through the formation model using the forward model;
   predicting a high-side gamma ray reading and low-side gamma ray reading based on the drilling direction of the drill bit; and
   adjusting the drilling direction by applying a corrective set point based on the high-side gamma ray reading and the low-side gamma ray reading.

4. The method of claim 3, wherein the confidence threshold is a measure of a fraction of predicted points along the drilling direction for which the forward model of the bed boundary correctly indicates that two separate activity beds are being detected.

5. The method of claim 1, wherein generating a forward model using the at least one tool characterization parameter comprises generating a set of tool-specific parameters unique for a specific tool including measurement precision, front-to-back ratio, or a combination thereof.

6. The method of claim 1, wherein drilling the wellbore comprises:
   receiving a real-time azimuthal gamma log;
   generating an inverse model using the at least one drilling parameter, the real-time azimuthal gamma log, and the formation model;
   generating actual formation gamma-ray activity using the inverse model; and
   steering a drill bit within the formation using the actual formation gamma-ray activity.

7. The method of claim 6, further comprising:
   generating an updated formation model using the actual formation gamma-ray activity;
   generating an updated forward model of the bed boundary using the updated formation model;
   predicting at least two updated azimuthal gamma logs using the updated forward model;
   determining that an updated difference between the at least two updated azimuthal gamma logs generates an updated confidence level that is greater than the confidence threshold;
   in response to determining that the updated difference between the at least two updated azimuthal gamma logs generates the updated confidence level that meets the confidence threshold, generating a modified well plan; and
   outputting a command for controlling the trajectory in directionally drilling the wellbore within the formation associated with the updated formation model using the modified well plan.

8. A system comprising:
   a processor; and
   a non-transitory memory device communicatively coupled to the processor comprising instructions that are executable by the processor to cause the processor to perform operations comprising:
receiving a real-time azimuthal gamma log;
generating an inverse model using at least one drilling parameter, the real-time azimuthal gamma log, and a formation model;
generating actual formation gamma-ray activity using the inverse model; and
outputting a command using the actual formation gamma-ray activity for steering a drill bit in directionally drilling a wellbore through a subterranean formation;
receiving at least one drilling parameter, tool characterization parameter, and a formation model;
generating a forward model of a tool response at a bed boundary using the at least one drilling parameter, the tool characterization parameter, and the formation model;
predicting at least two gamma logs using the forward model;
determining that a difference between the at least two gamma logs generates a confidence level that is greater than a confidence threshold;
in response to determining that the difference between the at least two gamma logs generates a confidence level that is greater than the confidence threshold, generating a well plan; and
wherein steering the drill bit is performed using the well plan.

9. The system of claim 8, wherein the operations further comprise:
determining that the difference between the at least two gamma logs generates a second confidence level that does not exceed the confidence threshold;
providing a request to modify the at least one drilling parameter, the formation model, or both;
adjusting the at least one drilling parameter, the tool characterization parameter, the formation model, or a combination thereof to generate an adjusted drilling parameter, an adjusted tool characterization parameter, an adjusted formation model, or a combination thereof;
generating at least two modified gamma logs based on the adjusted drilling parameter, the adjusted tool characterization parameter, the adjusted formation model, or a combination thereof;
determining that a modified difference between the at least two modified gamma logs generates a third confidence level that meets the confidence threshold;
in response to determining that the modified difference between the at least two modified gamma logs generates the third confidence level is greater than the confidence threshold, generating a modified well plan; and
outputting a command for controlling a trajectory in directionally drilling the wellbore within the subterranean formation associated with the adjusted formation model using the modified well plan.

10. The system of claim 8, wherein the operation of generating the forward model using the tool characterization parameter comprises generating a set of tool-specific parameters unique for a specific tool including measurement precision or front-to-back ratio.

11. The system of claim 8, wherein the operation of predicting the at least two gamma logs comprises:
determining a drilling direction of a drill bit through the formation model using the forward model;
predicting high-side gamma ray readings and low-side gamma ray readings based on the drilling direction of the drill bit; and
adjusting the drilling direction by applying a corrective set point based on the high-side gamma ray readings and the low-side gamma ray readings.

12. The system of claim 11, wherein the confidence threshold is a measure of a fraction of predicted points along the drilling direction for which the forward model of the bed boundary correctly indicates that two separate activity beds are being detected.

13. The system of claim 8, wherein the operations further comprise:
generating an updated formation model using the actual formation gamma-ray activity;
generating an updated forward model of the bed boundary using the updated formation model;
predicting at least two updated gamma logs using the updated forward model;
determining that an updated difference between the at least two updated gamma logs generates an updated confidence level that is greater than the confidence threshold;
in response to determining that the updated difference between the at least two updated gamma logs generates the updated confidence level that meets the confidence threshold, generating a modified well plan; and
outputting a command for controlling a trajectory in directionally drilling the wellbore within the formation associated with the updated forward model using the modified well plan.

14. A non-transitory computer-readable medium that includes instructions that are executable by a processing device to perform operations comprising:
receiving at least one drilling parameter, tool characterization parameter, and a formation model;
generating a forward model of a tool response at a bed boundary between a target formation and a neighboring formation using the at least one drilling parameter, the tool characterization parameter, and the formation model;
predicting at least two gamma logs using the forward model;
determining that a difference between the at least two gamma logs generates a confidence level that is greater than a confidence threshold; and
in response to determining that the difference between the at least two gamma logs generates the confidence level that is greater than the confidence threshold, generating a well plan.

15. The non-transitory computer-readable medium of claim 14, the operations further comprising:
determining that the difference between the at least two gamma logs generates a second confidence level that does not meet the confidence threshold;
providing a request to modify the at least one drilling parameter and formation model;
adjusting the at least one drilling parameter and formation model to generate an adjusted drilling parameter and an adjusted formation model;
generating at least two modified gamma logs based on the adjusted drilling parameter and the adjusted formation model;
determining that a modified difference between the at least two modified gamma logs generates a third confidence level that is greater than the confidence threshold;

in response to determining that the modified difference between the at least two modified gamma logs generates the third confidence level that is greater than the confidence threshold, generating a modified well plan; and outputting a command for controlling a trajectory in directionally drilling a wellbore within the formation associated with the adjusted formation model using the modified well plan.

16. The non-transitory computer-readable medium of claim 14, wherein the operation of generating the forward model of the bed boundary using the tool characterization parameter comprises generating a set of tool-specific parameters unique for a specific tool including measurement precision, front-to-back ratio, or a combination thereof.

17. The non-transitory computer-readable medium of claim 14, wherein the operation of predicting the at least two gamma logs comprises:

determining a drilling direction of a drill bit through the formation model using the forward model of the tool response at the bed boundary;

predicting high-side gamma-ray readings and low-side gamma-ray readings based on the drilling direction of the drill bit; and adjusting the drilling direction by applying a corrective set point based on the high-side gamma-ray readings and the low-side gamma-ray readings.

18. The non-transitory computer-readable medium of claim 14, the operations further comprising:

receiving a real-time gamma log;

generating an inverse model using the at least one drilling parameter, the real-time gamma log, the formation model, or a combination thereof;

generating actual formation gamma-ray activity using the inverse model;

updating the formation model using the actual formation gamma-ray activity; and steering a drill bit using the actual formation gamma-ray activity.

19. The non-transitory computer-readable medium of claim 18, the operations further comprising:

analyzing the actual formation gamma-ray activity generated from the inverse model;

determining a gamma-ray variance of the actual formation gamma-ray activity from the predicted values of high-side gamma-ray counts and low-side gamma-ray counts; and determining, using the gamma-ray variance, reservoir properties based on a comparison of an actual tool response and the forward model of the tool response.

* * * * *